United States Patent
Rhodes

(10) Patent No.: US 10,801,847 B2
(45) Date of Patent: Oct. 13, 2020

(54) METHOD AND APPARATUS TO PROVIDE ELECTRICAL OUTLET INFORMATION FOR ELECTRIFIED VEHICLES

(71) Applicant: FORD GLOBAL TECHNOLOGIES, LLC, Dearborn, MA (US)

(72) Inventor: Kevin James Rhodes, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 366 days.

(21) Appl. No.: 15/807,662

(22) Filed: Nov. 9, 2017

(65) Prior Publication Data
US 2019/0135123 A1  May 9, 2019

(51) Int. Cl.
| | |
|---|---|
| *G01C 21/34* | (2006.01) |
| *B60L 53/16* | (2019.01) |
| *G01C 21/36* | (2006.01) |
| *H01R 31/06* | (2006.01) |
| *H02J 7/00* | (2006.01) |

(52) U.S. Cl.
CPC .......... *G01C 21/3453* (2013.01); *B60L 53/16* (2019.02); *G01C 21/3679* (2013.01); *G01C 21/3697* (2013.01); *B60L 2250/16* (2013.01); *H01R 31/06* (2013.01); *H02J 7/0045* (2013.01)

(58) Field of Classification Search
CPC ............ G01C 21/3453; G01C 21/3679; G01C 21/3697; B60L 53/16
See application file for complete search history.

(56) References Cited

U.S. PATENT DOCUMENTS

| | | | |
|---|---|---|---|
| 5,369,352 A | 11/1994 | Toepfer et al. | |
| 10,272,793 B2* | 4/2019 | Perry | B60L 53/65 |
| 2012/0119576 A1* | 5/2012 | Kesler | H02J 50/90 307/10.1 |
| 2012/0179359 A1* | 7/2012 | Profitt-Brown | G01C 21/3469 701/123 |
| 2012/0309455 A1* | 12/2012 | Klose | B60L 53/68 455/557 |
| 2013/0110296 A1* | 5/2013 | Khoo | G06F 1/26 700/286 |
| 2013/0214738 A1* | 8/2013 | Chen | B60L 53/305 320/109 |

(Continued)

FOREIGN PATENT DOCUMENTS

| | | |
|---|---|---|
| CN | 204407925 | 6/2015 |
| GB | 2503349 | 8/2015 |

*Primary Examiner* — Donald J Wallace
(74) *Attorney, Agent, or Firm* — David B. Kelley; Carlson, Gaskey & Olds, P.C.

(57) ABSTRACT

A method according to an exemplary aspect of the present disclosure includes, among other things, generating a warning signal to identify any electrical characteristics along a vehicle route that differs from a current vehicle electrical characteristic. An electrified vehicle system according to an exemplary aspect of the present disclosure includes, among other things, a battery, an electric machine configured to receive electric power from the battery to drive vehicle wheels, and a system control that generates a warning signal to identify any electrical characteristics along a vehicle route that differ from a current vehicle electrical characteristic. In one example, the electrical characteristic comprises at least a type of plug and/or socket.

19 Claims, 3 Drawing Sheets

(56) References Cited

U.S. PATENT DOCUMENTS

| | | | |
|---|---|---|---|
| 2013/0219084 A1* | 8/2013 | Wu | G06F 3/00 710/11 |
| 2013/0249486 A1 | 9/2013 | Eberle | |
| 2013/0342165 A1* | 12/2013 | Brimacombe | B60L 11/1824 320/109 |
| 2013/0346902 A1* | 12/2013 | Epstein | B60L 53/30 715/771 |
| 2014/0129139 A1* | 5/2014 | Ellison | G01C 21/3469 701/533 |
| 2014/0316939 A1* | 10/2014 | Uyeki | B60L 58/21 705/26.9 |
| 2015/0028812 A1* | 1/2015 | Muller | B60L 53/68 320/109 |
| 2015/0112526 A1* | 4/2015 | Martin | G01C 21/3697 701/22 |
| 2015/0198459 A1* | 7/2015 | MacNeille | G01C 21/3697 701/22 |
| 2015/0226567 A1* | 8/2015 | North | G01C 21/3469 701/533 |
| 2015/0241233 A1* | 8/2015 | Loftus | G01C 21/3682 701/410 |
| 2015/0298565 A1* | 10/2015 | Iwamura | G01C 21/3476 701/22 |
| 2016/0036256 A1* | 2/2016 | Sukup | H02J 7/0052 320/107 |
| 2016/0275400 A1* | 9/2016 | Hodges | G06N 5/04 |
| 2016/0288658 A1 | 10/2016 | Rudolph et al. | |
| 2017/0141368 A1* | 5/2017 | Ricci | G01C 21/3673 |
| 2017/0217319 A1* | 8/2017 | Araki | G06Q 30/0282 |
| 2017/0276503 A1* | 9/2017 | Oh | G01C 21/3469 |
| 2019/0107406 A1* | 4/2019 | Cox | G01C 21/3469 |
| 2019/0383637 A1* | 12/2019 | Teske | G01C 21/3676 |

\* cited by examiner

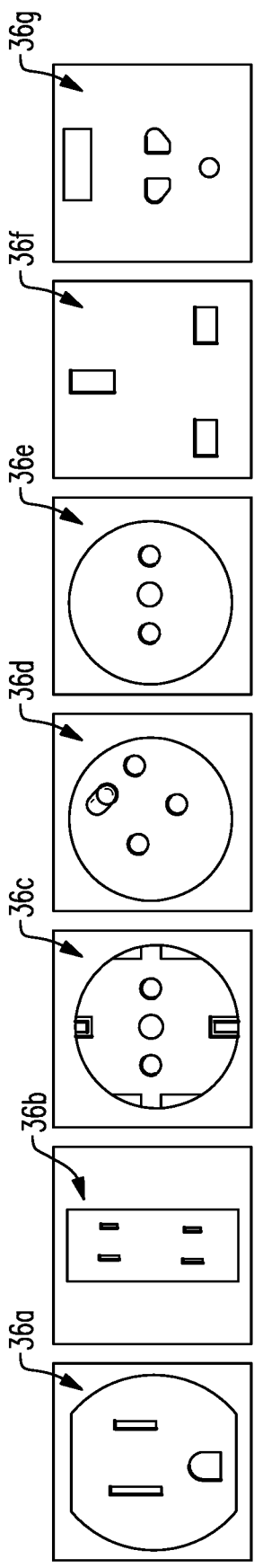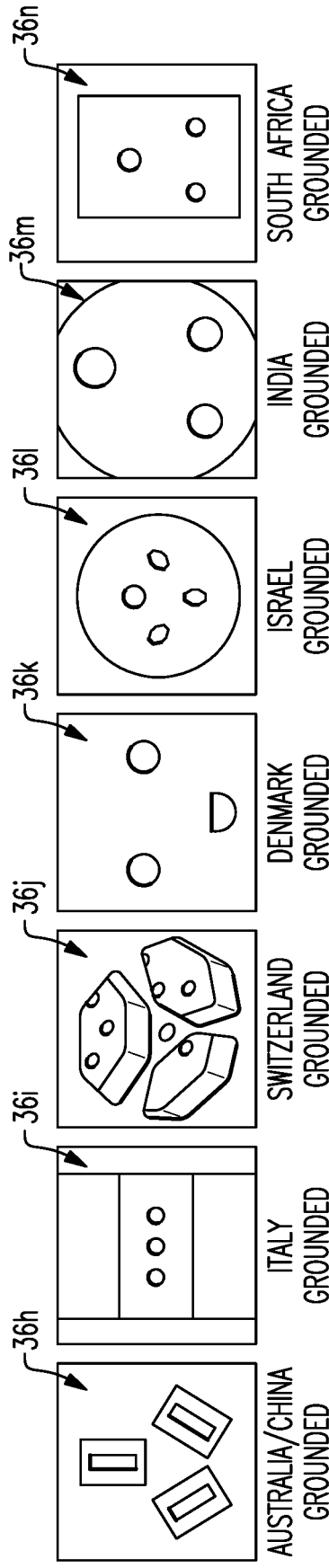

METHOD AND APPARATUS TO PROVIDE ELECTRICAL OUTLET INFORMATION FOR ELECTRIFIED VEHICLES

TECHNICAL FIELD

This disclosure relates to a method and system to provide electrical outlet information for an electrified vehicle based on a selected route.

BACKGROUND

In certain areas of the world, such as Europe for example, travel by vehicles across borders of different countries is very common. Also, in furtherance of reducing automotive fuel consumption, the use of electrified vehicles is becoming more popular. In general, electrified vehicles differ from conventional motor vehicles because they are selectively driven by one or more battery powered electric machines. However, this requires charging capability and related charging stations to replenish battery packs for these vehicles.

There are many different electricity standards throughout the various European countries. Each country has an electricity configuration with plug and socket types that may be different from other surrounding countries. This can make travel by electrified vehicle more challenging if travel routes include multi-country itineraries.

SUMMARY

A method according to an exemplary aspect of the present disclosure includes, among other things, generating a warning signal to identify any electrical characteristics along a vehicle route that differs from a current vehicle electrical characteristic.

In a further non-limiting embodiment of the foregoing method, the electrical characteristic comprises at least a type of plug and/or socket.

In a further non-limiting embodiment of either of the foregoing methods, the current vehicle electrical characteristic comprises a standard plug/socket type for an electrified vehicle in a home area.

In a further non-limiting embodiment of any of the foregoing methods, the method includes entering the vehicle route to a desired destination via a vehicle navigation system; and comparing the standard plug/socket type to types of plug/sockets along the vehicle route to identify any types of plug/sockets that are different from the standard plug/socket type.

In a further non-limiting embodiment of any of the foregoing methods, the method includes setting the standard plug/socket type as an initial default setting based on the home area.

In a further non-limiting embodiment of any of the foregoing methods, the method includes resetting the initial default setting of the home area in response to the electrified vehicle being moved to a new home area with a different plug/socket type to provide a new default setting.

In a further non-limiting embodiment of any of the foregoing methods, the method includes identifying each different type of plug/socket along the vehicle route as part of the warning signal.

In a further non-limiting embodiment of any of the foregoing methods, the method includes identifying any associated adaptor that may be required for each different type of plug/socket.

A method according to another exemplary aspect of the present disclosure includes, among other things: entering a route to a desired destination; comparing a vehicle plug/socket type to plug/socket types along the route to identify any plug/socket types that are different from the vehicle plug/socket type; and generating a warning signal when different plug/socket types are identified.

In a further non-limiting embodiment of any of the foregoing methods, the method includes identifying the vehicle plug/socket type as a standard plug/socket type for a home area.

In a further non-limiting embodiment of any of the foregoing methods, the method includes setting the standard plug/socket type as an initial default setting based on the home area.

In a further non-limiting embodiment of any of the foregoing methods, the method includes resetting the initial default setting of the home area in response to a vehicle being moved to a new home area with a different plug/socket type to provide a new default setting.

In a further non-limiting embodiment of any of the foregoing methods, the method includes entering the route via a vehicle navigation system in an electrified vehicle, identifying each different type of plug/socket along the route as part of the warning signal, and identifying any associated adaptor that may be required for each different type of plug/socket.

An electrified vehicle system according to another exemplary aspect of the present disclosure includes, among other things: a battery, an electric machine configured to receive electric power from the battery to drive vehicle wheels, and a system control that generates a warning signal to identify any electrical characteristics along a vehicle route that differ from a current vehicle electrical characteristic.

In a further non-limiting embodiment of the foregoing system, the system includes a navigation system in communication with the system control, wherein the route is entered into the navigation system.

In a further non-limiting embodiment of either of the foregoing systems, the electrical characteristic comprises at least a type of plug and/or socket, and wherein the current vehicle electrical characteristic comprises a standard plug/socket type for a home area.

In a further non-limiting embodiment of any of the foregoing systems, the system control sets the standard plug/socket type as an initial default setting based on the home area.

In a further non-limiting embodiment of any of the foregoing systems, the system control is configurable to reset the initial default setting of the home area in response to an electrified vehicle being moved to a new home area with a different plug/socket type to provide a new default setting.

In a further non-limiting embodiment of any of the foregoing systems, the system control identifies each different type of plug/socket along the route as part of the warning signal.

In a further non-limiting embodiment of any of the foregoing systems, the system control identifies any associated adaptor for each different type of plug/socket.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIGS. 2a-n show various examples of plug/socket types for different countries.

DETAILED DESCRIPTION

This disclosure details exemplary methods and systems that provide electrical outlet information for an electrified vehicle based on a selected route. These and other features are discussed in greater detail in the following paragraphs of this detailed description.

Figure 1A:
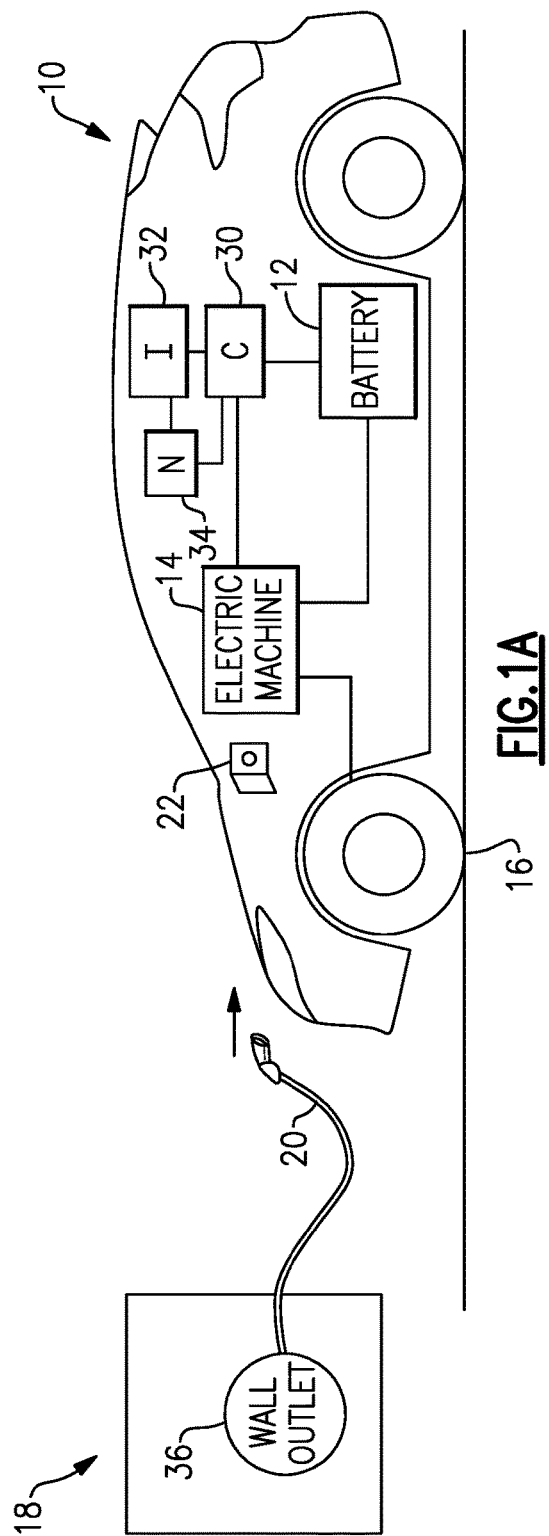
FIG. 1A schematically illustrates an electrified vehicle and a wall outlet.

FIG. 1A schematically illustrates an example electrified vehicle 10 that includes a battery 12, an electric machine 14, and a pair of wheels 16. The electric machine 14 can receive electric power from the battery 12. The electric machine 14 converts the electric power to torque that drives the wheels 16. The battery 12 is a high voltage traction battery in some embodiments.

The example electrified vehicle 10 is an all-electric vehicle, i.e. a battery electric vehicle (BEV). In other examples, the electrified vehicle 10 is a hybrid electric vehicle or plug-in hybrid electric vehicle (PHEV), which can selectively drive the wheels 16 with torque provided by an internal combustion engine instead of, or in addition to, the electric machine. Other electrified vehicles which may include a fuel cell or other sources of energy used in combination with a battery are also contemplated.

Figure 1B:
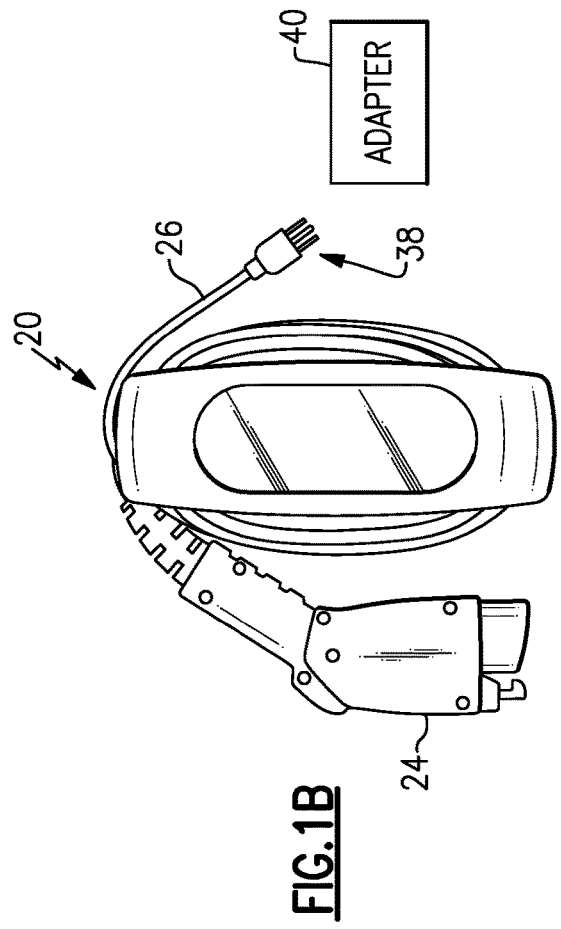
FIG. 1B shows a charger used to plug into the wall outlet and vehicle of FIG. 1A.

The battery 12 will periodically require recharging. A wall outlet 18 can provide power to recharge the battery 12. In one example, a charger 20 connects a port 22 of the electrified vehicle 10 to the wall outlet 18. As shown in FIG. 1B, the charger 20 has a first end 24 that connects to the port 22 and a second end 26 that is inserted into the wall outlet 18. The first end 24 of the charger 20 is a standard connector that does not change and the second end 26 comprises a plug with prongs 38. When the electrified vehicle 10 and the wall outlet 18 are electrically coupled, power can be supplied to the electrified vehicle 10 to recharge the battery 12.

The example electrified vehicle 10 includes a system to control operation of the battery 12 and electric machine 14, as well as to interface with an operator of the vehicle 10. In one example, the system includes a controller 30, an operator interface 32, and a navigation system 34 that communicate with each other. The controller 30 can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The controller 30 may be a hardware device for executing software, particularly software stored in memory that may include one or more separate programs, each of which includes an ordered listing of executable instructions for implementing logical functions. The controller 30 can be a custom made or commercially available processor, a central processing unit (CPU), an auxiliary processor among several processors associated with the computing device, a semiconductor based microprocessor (in the form of a microchip or chip set) or generally any device for executing software instructions. The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.).

The interface 32 can include various input and output devices that may communicate with the controller input and output interfaces. The interface 32, for example, may be a touch screen within the vehicle 10 via which information can be communicated to the operator or through which the operator can communicate to the controller 30. In additional, the interface 32 may also include a wireless communication interface where the vehicle controller 30 and operator can communicate via a mobile device such as a smart phone or tablet, or an internet browser for example.

The battery 12 is an exemplary electrified vehicle battery. The battery 12 may be a high voltage traction battery pack that includes a plurality of battery assemblies (i.e., battery arrays or groupings of battery cells) capable of outputting electrical power to operate the electric machine 14. In one non-limiting embodiment, the electrified vehicle 10 operates in an Electric Vehicle (EV) mode where the electric machine 14 is used for vehicle propulsion, thereby depleting the battery 12 state of charge up to its minimum allowable value under certain driving patterns/cycles.

In one example, when the vehicle is not in use, the operator preferably places the second end 26 of the charger 20 in the wall outlet 18 and the first end 24 in the port 22 such that the wall outlet 18 can replenish the depleted battery power. However, in certain areas of the world, such as Europe for example, travel often occurs across borders of different countries. There are many different electricity standards throughout the various European countries and each country can have plug and socket types that are different from those of other surrounding countries. This can make travel by electrified vehicle more challenging if a selected travel route crosses multiple countries.

The wall outlet 18 of FIG. 1A comprises an electrical outlet plug/socket type 36 that can vary from location to location. FIGS. 2A-N show different types of electrical outlet plug/socket types 36 for various different countries. FIG. 2A shows one example of a plug/socket type 36a for North America. FIG. 2B shows one example of a plug/socket type 36b for Japan. FIG. 2C shows one example of a plug/socket type 36c for Germany FIG. 2D shows one example of a plug/socket type 36d for France. FIG. 2E shows one example of a plug/socket type 36e for Europe/Russia. FIGS. 2F and 2G show one examples of a plug/socket types 36f, 36g for Great Britain. FIG. 2H shows one example of a plug/socket type 36h for Australia/China. FIG. 2I shows one example of a plug/socket type 36i for Italy. FIG. 2J shows one example of a plug/socket type 36j for Switzerland. FIG. 2K shows one example of a plug/socket type 36k for Denmark. FIG. 2L shows one example of a plug/socket type 36*l* for Israel. FIG. 2M shows one example of a plug/socket type 36*m* for India. FIG. 2N shows one example of a plug/socket type 36*n* for South Africa.

These different plug/socket types 36*a-n* can comprise grounded or non-grounded configurations. Further, as shown, the plug/socket types 36*a-n* include different numbers of prongs/pins 38 (FIG. 1B) and associated prong/pin openings (FIGS. 2A-N). Also, as known, these plug/socket types 36*a-n* do not always have common voltage ranges and/or current configurations. Thus, if an operator/user takes the vehicle 10 from their home country into a neighboring country, they may find themselves unable to plug into, or connect with, an electrical outlet or charging station outlet in the neighboring country with their current charging cord configuration. This can be a major concern when there is limited available range and there is a realization that charging is required.

Figure 3:
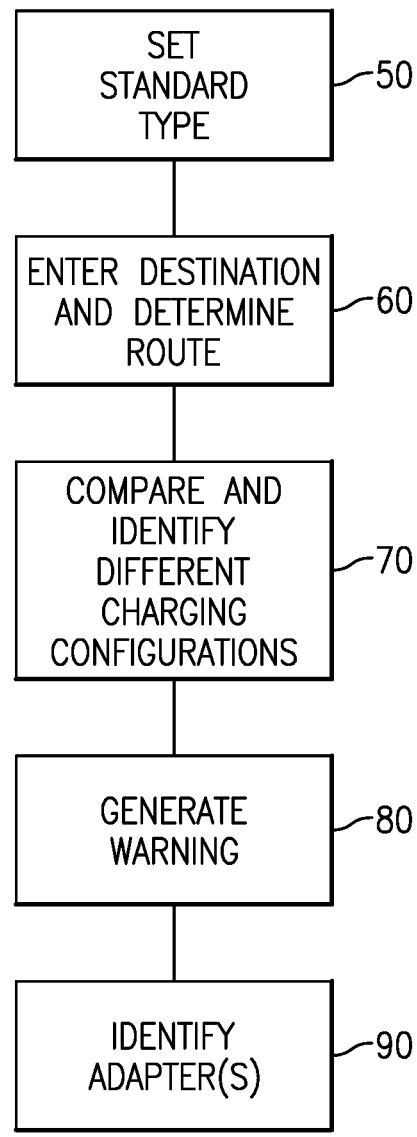
FIG. 3 is flow diagram showing a method for providing electrical outlet information for an electrified vehicle based on a selected route.

The subject invention provides the vehicle control system with the capability to identify when the plug/socket type along a desired travel route changes from that of the vehicle's current charging configuration. As discussed above, the vehicle navigation system 34 is in communication with the controller 30. The controller 30 receives a desired destination for the vehicle 10 based on an input to the navigation system 34 via the user interface 32, for example. The controller 30 then determines one or more possible routes for the desired destination and identifies the electrical characteristics for charging capability that vary along the routes. The controller 30 then can generate a warning signal to identify any electrical characteristics along the routes that differ from the current vehicle electrical characteristic. This will be discussed in greater detail with regard to the flow chart of FIG. 3.

In one example, in an initial step 50, the current vehicle electrical characteristic is set as a standard plug/socket type for the electrified vehicle 10 in a home area. In one example, this can be configured as part of the vehicle settings that can be programmed to set the standard plug/socket type as an initial default setting based on the home area. If the vehicle is moved to a different home area with a different plug/socket type, the system is configured such that the operator/user can reset the initial default setting of the home area to a new home area with a different plug/socket type to provide a new default setting.

Once the standard plug/socket type is set for the home area, the controller 30 can then determine when a route leaves the home area and enters another area with a different plug/socket type. As such, at step 60, a desired destination will be entered into the vehicle navigation system 34, which will then generate a proposed route. The controller 30 will then, at step 70, compare the standard plug/socket type of the vehicle to types of plug/sockets along the route to identify any types of plug/sockets that are different from the standard plug/socket type. In one example, the controller 30 will identifying each different type of plug/socket type along the route and provide this information as part of the warning signal as indicated at step 80. Finally, at step 90, the controller 30 can further identify any associated adaptor 40 (FIG. 1B) that may be required for each different type of plug/socket along the route.

As such, the subject invention provides a warning system in the electrified vehicle where a user/operator is immediately notified that the wall outlets and/or charging configuration along the route are different than those of the home area in response to entering a destination into the navigation system. A vehicle display can then automatically inform the user of the differences and what, if any, specific charging adaptors 40 will be needed. For example, if a driver is traveling from a home area in France to a vacation in Italy, the controller 30 will be able to determine that Italy has a different plug/socket type than France. When the driver in France enters the Italian destination into the navigation system 34, the control system will immediately and automatically alert the driver that a certain type of adaptor 40 will be needed in order to use their charger 20 for charging in Italy.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method, comprising:
  generating a warning signal to identify any electrical characteristics along a vehicle route that differs from a current vehicle electrical characteristic, wherein the electrical characteristic comprises at least a type of plug and/or socket.

2. The method as recited in claim 1, wherein: the current vehicle electrical characteristic comprises a standard plug/socket type for an electrified vehicle in a home area.

3. The method as recited in claim 2, comprising:
  entering the vehicle route to a desired destination via a vehicle navigation system; and
  comparing the standard plug/socket type to types of plug/sockets along the vehicle route to identify any types of plug/sockets that are different from the standard plug/socket type.

4. The method as recited in claim 2, comprising:
  setting the standard plug/socket type as an initial default setting based on the home area.

5. The method as recited in claim 4, comprising:
  resetting the initial default setting of the home area in response to the electrified vehicle being moved to a new home area with a different plug/socket type to provide a new default setting.

6. The method as recited in claim 1, comprising:
  identifying each different type of plug/socket along the vehicle route as part of the warning signal.

7. The method as recited in claim 6, comprising:
  identifying any associated adaptor that may be required for each different type of plug/socket.

8. A method, comprising:
  entering a route to a desired destination;
  comparing a vehicle plug/socket type to plug/socket types along the route to identify any plug/socket types that are different from the vehicle plug/socket type; and
  generating a warning signal when different plug/socket types are identified.

9. The method as recited in claim 8, comprising:
identifying the vehicle plug/socket type as a standard plug/socket type for a home area.

10. The method as recited in claim 9, comprising:
setting the standard plug/socket type as an initial default setting based on the home area.

11. The method as recited in claim 10, comprising:
resetting the initial default setting of the home area in response to a vehicle being moved to a new home area with a different plug/socket type to provide a new default setting.

12. The method as recited in claim 8, comprising:
entering the route via a vehicle navigation system in an electrified vehicle,
identifying each different type of plug/socket along the route as part of the warning signal, and
identifying any associated adaptor that may be required for each different type of plug/socket.

13. An electrified vehicle system for an electrified vehicle comprising:
a battery,
an electric machine configured to receive electric power from the battery to drive vehicle wheels, and
a system control that generates a warning signal to identify any electrical characteristics along a vehicle route that differ from a current vehicle electrical characteristic, wherein the electrical characteristic comprises at least a type of plug and/or socket.

14. The system as recited in claim 13, comprising:
a navigation system in communication with the system control, wherein the route is entered into the navigation system.

15. The system as recited in claim 13, wherein the current vehicle electrical characteristic comprises a standard plug/socket type for a home area.

16. The system as recited in claim 15, wherein: the system control sets the standard plug/socket type as an initial default setting based on the home area.

17. The system as recited in claim 16, wherein: the system control is configurable to reset the initial default setting of the home area in response to the electrified vehicle being moved to a new home area with a different plug/socket type to provide a new default setting.

18. The system as recited in claim 13, wherein: the system control identifies each different type of plug/socket along the route as part of the warning signal.

19. The system as recited in claim 18, wherein: the system control identifies any associated adaptor for each different type of plug/socket.

* * * * *

UNITED STATES PATENT AND TRADEMARK OFFICE
CERTIFICATE OF CORRECTION

PATENT NO. : 10,801,847 B2  
APPLICATION NO. : 15/807662  
DATED : October 13, 2020  
INVENTOR(S) : Kevin James Rhodes It is certified that error appears in the above-identified patent and that said Letters Patent is hereby corrected as shown below:

On the Title Page

Item (71) Applicant: Replace "FORD GLOBAL TECHNOLOGIES, LLC, Dearborn, MA (US)" with --FORD GLOBAL TECHNOLOGIES, LLC, Dearborn, MI (US)--

Signed and Sealed this  
Twenty-second Day of March, 2022

Drew Hirshfeld  
*Performing the Functions and Duties of the*  
*Under Secretary of Commerce for Intellectual Property and*  
*Director of the United States Patent and Trademark Office*